United States Patent
Saito et al.

(10) Patent No.: US 6,461,755 B1
(45) Date of Patent: Oct. 8, 2002

(54) ELECTROCONDUCTIVE RESIN COMPOSITION, FUEL CELL SEPARATOR MADE OF SAID ELECTROCONDUCTIVE RESIN COMPOSITION, PROCESS FOR PRODUCTION OF SAID FUEL CELL SEPARATOR, AND SOLID POLYMER TYPE FUEL CELL USING SAID FUEL CELL SEPARATOR

(75) Inventors: Kazuo Saito; Atsushi Hagiwara; Fumio Tanno; Yasuo Imashiro; Naofumi Horie; Tsutomu Uehara, all of Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 61 days.

(21) Appl. No.: 09/588,559

(22) Filed: Jun. 7, 2000

(30) Foreign Application Priority Data

Jun. 9, 1999 (JP) .......................................... 11-162213

(51) Int. Cl.$^7$ ............................................... H01M 2/00
(52) U.S. Cl. .......................... 429/34; 429/30; 429/254; 252/510; 252/511; 264/239
(58) Field of Search ............................ 429/34, 35, 254, 429/30; 252/510, 511; 264/239

(56) References Cited

U.S. PATENT DOCUMENTS 6,242,124 B1 * 6/2001 Saito et al. .................... 429/38

FOREIGN PATENT DOCUMENTS

JP          3-2261 A    *   1/1991

* cited by examiner

*Primary Examiner*—Laura Weiner
(74) *Attorney, Agent, or Firm*—Kubovcik & Kubovcik

(57) ABSTRACT

The present invention provides: an electroconductive resin composition comprising:

(A) a liquid crystal polyester resin capable of forming an anisotropic melt phase, in an amount of 100 parts by weight, (B) a carbodiimide compound in an amount of 0.01 to 30 parts by weight, (C) an electroconductive carbon powder in an amount of 50 to 3,000 parts by weight, and (D) a filler in an amount of 0 to 10,000 parts by weight;

a fuel cell separator made of the above electroconductive resin composition; a process for producing the above fuel cell separator; and a solid polymer type fuel cell using the above fuel cell separator.

The electroconductive resin composition alleviates the problems of the prior art, can be mass-produced, and is superior in high temperature resistance and hydrolysis resistance.

3 Claims, No Drawings

ELECTROCONDUCTIVE RESIN COMPOSITION, FUEL CELL SEPARATOR MADE OF SAID ELECTROCONDUCTIVE RESIN COMPOSITION, PROCESS FOR PRODUCTION OF SAID FUEL CELL SEPARATOR, AND SOLID POLYMER TYPE FUEL CELL USING SAID FUEL CELL SEPARATOR

BACKGROUND OF THE INVENTION

1. Field of the Invention

The present invention relates to an electroconductive resin composition, fuel cell separator made of said electroconductive resin composition, process for production of said fuel cell separator, and solid polymer type fuel cell using said fuel cell separator.

2. Description of the Prior Art

In fuel cells, one pair of electrodes are contacted with each other via an electrolyte; a fuel is fed into one of the electrodes and an oxidizing agent is fed to the other electrode; the fuel is oxidized electrochemically; thereby, a chemical energy is converted directly into an electrical energy. Such fuel cells have various types depending upon the kind of the electrolyte used therein. In recent years, attention has been paid to a solid polymer type fuel cell using a solid polymer electrolyte membrane, which is a fuel cell capable of generating a high output.

In such a solid polymer type fuel cell, a hydrogen gas (which is a fluid) is fed to the fuel electrode and an oxygen gas (which is also a fluid) is fed to the oxidizing agent electrode, and an electric current is taken out from an external circuit. In the individual electrodes, the following reactions take place.

Fuel Cell Electrode

Oxidizing Agent Electrode

Hydrogen ($H_2$) becomes proton ($H^+$) on the fuel cell electrode, and this proton moves onto the oxidizing agent electrode through a solid polymer electrolyte membrane and reacts with oxygen ($O_2$) on the oxidizing agent electrode, generating water ($H_2O$). Therefore, in operating a solid polymer type fuel cell, it is necessary to feed and discharge reactant gases and take out the electricity generated. Further in the solid polymer type fuel cell, it is necessary to manage and feed water to the fuel electrode and discharge water from the oxidizing agent electrode, because the fuel cell is designed to be operated ordinarily in a wet atmosphere of room temperature to 120° C. and water is inevitably handled in a liquid state.

Of the components constituting a fuel cell, the separator functions so as to prevent a fuel gas, an oxidizing agent gas and cooling water (all flowing in the fuel cell) from mixing with each other, and is required to have gas barrier property, electrical conductivity, corrosion resistance, etc.

As the separator for solid polymer type fuel cell, there have been proposed various types which are advantageous in productivity and cost. They are made of a carbon composite material using, as a binder, a thermoplastic resin or a thermosetting resin. For example, a separator using a thermosetting resin as a binder is described in JP-A-55-019938, and a separator using a thermoplastic resin (e.g. polypropylene or nylon) as a binder is described in JP-A-57-61752 and JP-A-57-617521.

Separators made of a carbon composite material using a thermoplastic or thermosetting resin as a binder, however, as compared with conventional separators produced by machining of graphite sheet, have had problems in high temperature resistance and hydrolysis resistance although they are superior in productivity and cost.

SUMMARY OF THE INVENTION

The main object of the present invention is to provide an electroconductive resin composition which alleviates the above-mentioned problems of the prior art, can be mass-produced, and is superior in high temperature resistance and hydrolysis resistance.

The present inventor made a study on electroconductive resin compositions low in resistivity and high in mechanical strength. As a result, it was found out that by adding, to an electroconductive carbon powder, a binder which is a resin composition comprising a liquid crystal polyester (LCP) and a carbodiimide compound, the resulting electroconductive composite material is improved in water resistance of LCP (the LCP water resistance has been a problem in the prior art), has a low resistivity, and is improved in mechanical strength and gas barrier property. This finding has led to the completion of the present invention.

The present invention provides:
an electroconductive resin composition comprising:
(A) a liquid crystal polyester resin capable of forming an anisotropic melt phase, in an amount of 100 parts by weight,
(B) a carbodiimide compound in an amount of 0.01 to 30 parts by weight,
(C) an electroconductive carbon powder in an amount of 50 to 3,000 parts by weight, and
(D) a filler in an amount of 0 to 10,000 parts by weight;
a fuel cell separator made of the above electroconductive resin composition;
a process for producing the above fuel cell separator; and
a solid polymer type fuel cell using the above fuel cell separator.

DETAILED DESCRIPTION OF THE INVENTION

The present invention is described in detail below.

The liquid crystal polyester used as the component (A) in the present invention is a polyester called a thermotropic liquid crystal polymer and is capable of forming an anisotropic melt phase. In the present invention, there is used, in particular, a liquid crystal polyester which shows no deformation in the form of a composition when placed in the operating conditions of solid polymer type fuel cell and which has a heat deformation temperature of 80° C. or more, preferably 80 to 400° C., more preferably 120 to 350° C.

As the liquid crystal polyester used in the present invention, there can be specifically mentioned (i) a reaction product of an aromatic dicarboxylic acid and an aromatic hydroxycarboxylic acid, (ii) a reaction product of different aromatic hydroxycarboxylic acids, (iii) a reaction product of an aromatic dicarboxylic acid and an aromatic diol and (iv) a reaction product of a polyester (e.g. polyethylene terephthalate) and an aromatic hydroxycarboxylic acid. Incidentally, the above aromatic dicarboxylic acid or aromatic diol or aromatic hydroxycarboxylic acid may be replaced by an ester-forming derivative thereof.

The repeating structural unit of the liquid crystal polyester can be exemplified by the followings, but is not restricted thereto.

Repeating Structural Units Derived from aromatic hydroxycarboxylic acid
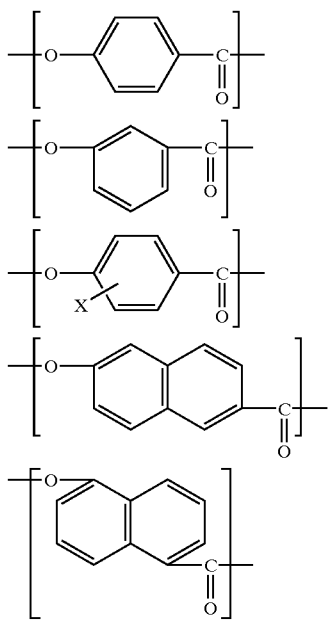
In the above, X is a halogen atom, an allyl group or an alkyl group (the same applies hereinafter).
Repeating Structural Units Derived from aromatic dicarboxylic acid
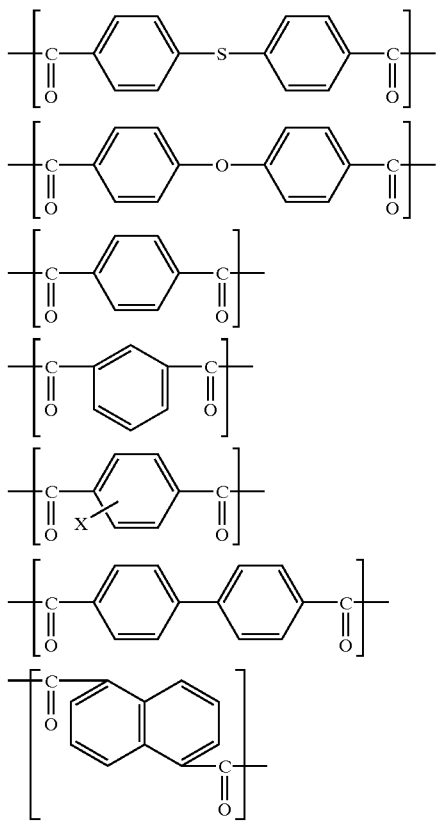
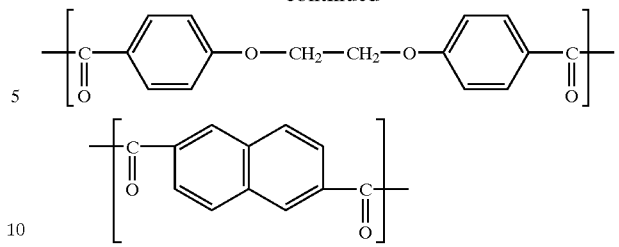
Repeating Structural Units Derived from aromatic diol
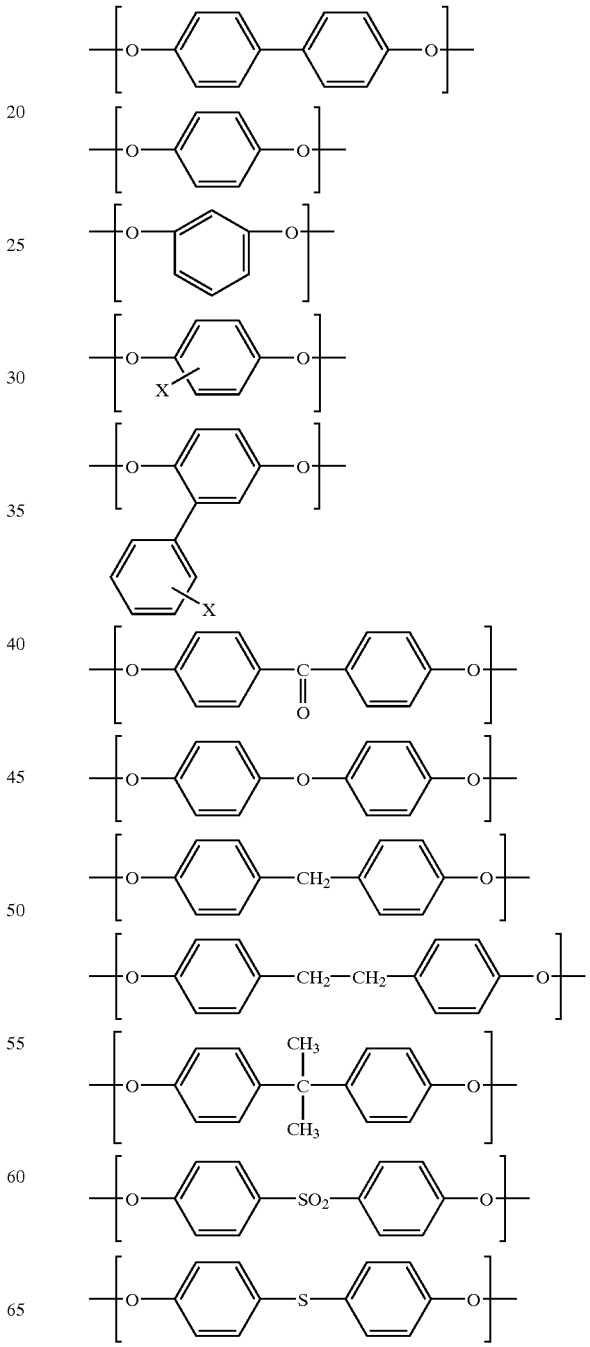

-continued

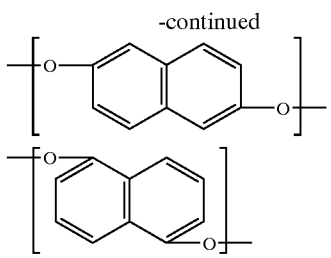

The liquid crystal polyester preferably contains at least 30 mole % of a repeating structural unit derived from aromatic hydroxycarboxylic acid, in view of the balance of heat resistance, mechanical property and processability.

The carbodiimide compound used as the component (B) in the present invention is a compound having at least one carbodiimide group (—N=C=N—) in the molecule, and is a monocarbodiimide compound represented by the following formula:

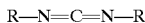

R—N=C=N—R or a polycarbodiimide compound represented by the following formula:

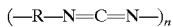

(—R—N=C=N—)$_n$ wherein R has at least one carbon atom and n is an integer of 2 or more.

As the monocarbodiimide compound, there can be used those synthesized by a well known method. It can be synthesized, for example, by subjecting an isocyanate to decarboxylation and condensation at a temperature of about 70° C. or higher in a solvent-free state or in an inert solvent, using, as a carbodiimidization catalyst, 3-methyl-1-phenyl-2-phosphorene-1-oxide.

As specific examples of the monocarbodiimide compound, there can be mentioned dicyclohexylcarbodiimide, diisopropylcarbodiimide, dimethylcarbodiimide, diisobutylcarbodiimide, dioctylcarbodiimide, t-butylisopropylcarbodiimide, diphenylcarbodiimide, di-t-butylcarbodiimide and di-β-naphthylcarbodiimide. Of these, preferred are dicyclohexylcarbodiimide and diisopropylcarbodiimide for their high industrial availability.

The polycarbodiimide can be produced by various methods. Fundamentally, it can be produced by conventional methods for polycarbodiimide production, described in U.S. Pat. No. 2,941,956; JP-B-47-33279; J. Org. Chem., 28, 2069–2075 (1963); and Chemical Review 1981, Vol. 81, No. 4, pp. 619–621. Specifically, it can be produced by subjecting an organic diisocyanate to decarboxylation and condensation to synthesize an isocyanate-terminated polycarbodiimide.

The organic diisocyanate used as a raw material in the above method for production of polycarbodiimide compound, can be, for example, an aromatic diisocyanate, an aliphatic diisocyanate, an alicyclic diisocyanate or a mixture thereof. Specific examples of the organic diisocyanate are 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,4'-diisocyanate, methylcyclohexane diisocyanate, tetramethylxylylene diisocyanate, 2,6-diisopropylphenyl isocyanate and 1,3,5-triisopropylbenzene-2,4-diisocyanate.

In the above production of a polycarbodiimide compound from an organic diisocyanate, the polycarbodiimide compound obtained may have an appropriately controlled polymerization degree by using a compound (e.g. a monoisocyanate) capable of reacting with the terminal isocyanate of polycarbodiimide.

As the monoisocyanate capable of blocking the terminal of polycarbodiimide to allow the final polycarbodiimide to have an appropriately controlled polymerization degree, there can be mentioned, for example, phenyl isocyanate, tolyl isocyanate, dimethylphenyl isocyanate, cyclohexyl isocyanate, butyl isocyanate and naphthyl isocyanate.

As other compounds capable of blocking the terminal of polycarbodiimide, there can be used active hydrogen compounds capable of reacting with the terminal isocyanate of polycarbodiimide. They are aliphatic, aromatic or alicyclic compounds such as —OH group-containing compounds (e.g. methanol, ethanol, phenol, cyclohexanol, N-methylethanolamine, polyethylene glycol monomethyl ether and polypropylene glycol monomethyl ether), =NH group-containing compounds (e.g. diethylamine and dicyclohexylamine), —NH$_2$ group-containing compounds (e.g. butylamine and cyclohexylamine), —COOH group-containing compounds (e.g. succinic acid, benzoic acid and cyclohexanoic acid), —SH group-containing compounds (e.g. ethylmercaptan, allylmercaptan and thiophenol), epoxy group-containing compounds and the like.

The decarboxylation and condensation of an organic diisocyanate proceeds in the presence of a carbodiimidization catalyst. As the catalyst, there can be used phosphorene oxides such as 1-phenyl-2-phosphorene-1-oxide, 3-methyl-1-phenyl-2-phosphorene-1-oxide, 1-ethyl-2-phosphorene-1-oxide, 3-methyl-2-phosphorene-1-oxide, 3-phosphorene isomers thereof and the like. Of these, preferred is 3-methyl-1-phenyl-2-phosphorene-1-oxide for the reactivity.

As the electroconductive carbon powder used as the component (C) in the present invention, there can be mentioned powders of scaly graphite, lumpy graphite, acetylene black, carbon black, Ketjen Black, expanded graphite and artificial graphite. The average particle diameter of the powder can be in a range of 10 nm to 100 μm, preferably 5 to 80 μm.

The filler used as the component (D) in the present invention can be a fibrous organic or inorganic filler. Specific examples thereof can be a glass fiber, a silica glass fiber, an alumina fiber, a silicon carbide fiber, a ceramic fiber, an asbestos fiber, a gypsum fiber and a metal fiber.

The filler may also be a particulate organic or inorganic filler. Specific examples thereof can be silicates such as wollastonite, sericite, kaolin, mica, clay, bentonite, asbestos, talc, aluminosilicate and the like; metal oxides such as alumina, silicon oxide, magnesium oxide, zirconium oxide, titanium oxide and the like; carbonates such as calcium carbonate, magnesium carbonate, dolomite and the like; sulfates such as calcium sulfate, barium sulfate and the like; glass beads; boron nitride; silicon carbide; saloyan; and silica. These fillers may be hollow or porous.

These reinforcing agents may beforehand be treated with an ordinary surface-treating agent such as silane coupling agent, carbodiimide, various emulsions or the like, in order to have a higher adhesion to the LCP which is a binder.

In the electroconductive resin composition of the present invention comprising the above-explained components (A) to (D), the amount ratio of each component is as follows.

(A) A liquid crystal polyester resin capable of forming an anisotropic melt phase: 100 parts by weight
(B) A carbodiimide compound: 0.01 to 30 parts by weight, preferably 0.5 to 5 parts by weight
(C) An electroconductive carbon powder: 50 to 3,000 parts by weight, preferably 100 to 2,000 parts by weight
(D) A filler: 0 to 10,000 parts by weight When the amount of the component (B) is 0.01 part by weight or more, particularly 0.5 part by weight or more, the resulting fuel cell separator can have improved hydrolysis resistance and gas barrier property. When the amount is 30 parts by weight or less, particularly 5 parts by weight or less, the resulting separator can have low electrical resistance required for separator.

When the amount of the component (C) is 50 parts by weight or more, the resulting separator can have low electrical resistance. When the amount is 3,000 parts by weight or less, the resulting separator can have good mechanical strength required for separator. Furthermore, when the amount is within the range of 100 to 2,000 parts by weight, the resulting separator can have lower electrical resistance and better mechanical strength.

When the amount of the component (D) is 10,000 parts by weight or less, the resulting separator can have good mechanical strength required for separator.

The fuel cell separator of the present invention can be produced according to the production process of the present invention, that is, by mixing the components (A) to (D) to prepare an electroconductive resin composition and molding the composition into a separator shape.

Specifically, first, the components (A) to (D) are mixed in the above-mentioned amount ratio to prepare an electroconductive resin composition. Preferably, the components (A) to (D) are melt-kneaded. For example, they are melt-kneaded at a temperature of 200 to 400° C. using a Banbury mixer, a rubber roll, a kneader, a single- or double-screw extruder or the like, whereby an electroconductive resin composition can be obtained.

Prior to the above melt-kneading, known mixing by stirring rod, ball mill, sample mixer, static mixer, ribbon blender or the like may be conducted in order to improve the dispersion of the liquid crystal polyester resin and the electroconductive carbon powder.

The electroconductive resin composition obtained in a molten state may be molded into a separator shape, as it is. As necessary, the resin composition may be converted into pellets; further, the pellets may be dried by a known method such as fluidized bed drying, hot air circulation drying, vacuum drying, vacuum fluidized bed drying or the like.

Lastly, the electroconductive resin composition is shaped into a desired separator shape for solid polymer type fuel cell. This molding can be carried out by one method or a combination of two or more methods, selected from known methods including injection molding, compression molding, injection-compression molding, transfer molding, extrusion molding, isostatic molding, belt pressing, press molding, roll molding, etc. Of these, injection molding is advantageous for mass production.

The shape of the separator is ordinarily a sheet having at least one gas passage of large total length and curved complicated pattern and at least one perforation called manifolds, because such a sheet can separate a fuel electrode and an oxidizing agent electrode and can efficiently diffuse a fuel and an oxidizing agent in a fuel cell. Incidentally, in some of the separators, only one of the gas passage and manifold is formed and the other is not formed.

The thus-obtained separator for solid polymer type fuel cell is assembled into a fuel cell of the present invention. The assembling is made, for example, as follows and the assembled fuel cell is operated, for example, as follows.

That is, a fuel electrode and an oxidizing agent electrode are adhered to the two sides of an electrolyte layer (which is a solid polymer electrolyte membrane) to form a fuel cell; to the fuel electrode side of the fuel cell is adhered a separator of the present invention having a plurality of passages for fuel gas and manifolds; to the oxidizing agent electrode side of the fuel cell is adhered a separator of the resent invention having a plurality of passages for oxidizing agent gas and manifolds; thereby, a single cell is assembled. A plurality of such single cells are laminated in series; a fastening sheet is provided at each end of the laminate via an insulating sheet; the resulting material is pressurized and kept in that state; a fuel gas is fed into the fuel electrode and an oxidizing agent gas is fed into the oxidizing agent electrode; thus, power-generating operation is conducted to obtain a direct current.

The present invention is described in more detail below by way of Examples. However, the present invention is not restricted to these Examples.

EXAMPLES 1 to 3 and COMPARATIVE EXAMPLES 1 and 2

590 g of 4,4'-dicyclohexylmetane diisocyanate, 62.6 g of cyclohexyl isocyanate and 6.12 g of a carbodiimidization catalyst (3-methyl-1-phenyl-2-phosphorene-1-oxide) were reacted at 180° C. for 48 hours to obtain a (4,4'-dicyclohexylmethane)polycarbodiimide (average polymerization degree=100 or less).

An LCP (a wholly aromatic thermoplastic polyester having a heat deformation temperature of 240° C. at 18.6 kg/mm$^2$, each LCP appearing later is the same as this LCP), the above-obtained (4,4'-dicyclohexylmethane) polycarbodiimide (abbreviated as PCD in Table 1), an electroconductive carbon powder (abbreviated as C in Table 1) and a filler (abbreviated as FR in Table 1) were melt-kneaded in proportions shown in Table 1, using a double-screw extruder to prepare a master batch. This master batch was subjected to injection molding using an injecting molding machine to produce multipurpose dumbbells (10 mm in width, 4 mm in thickness and 100 mm in length) specified by JIS K 713, for use as test pieces.

Each test piece was measured for properties by the following test methods.

Bending Strength

Measured using a multipurpose tester, Model 5544 produced by Instron, at a chuck-to-chuck distance of 50 mm at a test speed of 0.5 mm/min.

Resistivity

Measured by a four-probe method, using Σ-10 produced by Nakamura Seimitsu.

EXAMPLE 4

TABLE 1

| | LCP (parts by weight) | PCD (parts by weight) | C (parts by weight) | FR (parts by weight) | Resistivity (mΩ · cm) | Bending strength (kgf/cm$^2$) |
|---|---|---|---|---|---|---|
| Ex. 1 | 100 | 2 | 100 | | 13.7 | 4.68 |
| Ex. 2 | 100 | 2 | 900 | | 4.3 | 4.52 |
| Ex. 3 | 100 | 2 | 900 | 100 | 4.0 | 6.95 |
| Comp. | 100 | | 400 | | 18.9 | 4.23 |

TABLE 1-continued

| | LCP (parts by weight) | PCD (parts by weight) | C (parts by weight) | FR (parts by weight) | Resistivity (mΩ·cm) | Bending strength (kgf/cm²) |
|---|---|---|---|---|---|---|
| Ex. 1 Comp. Ex. 2 | 100 | | 900 | | 5.5 | 4.35 |

The test piece produced in Example 1 was treated in a hot water of 120° C. for 200 hours and then measured for bending strength and resistivity. The result is shown in Table 2.

COMPARATIVE EXAMPLE 3

The test piece produced in Comparative Example 1 was subjected to the same operation as in Example 4. The result is shown in Table 2.

TABLE 2

| | Bending strength (kgf/cm²) | Resistivity (mΩ·cm) |
|---|---|---|
| Example 4 | 4.68 | 13.7 |
| Comparative Example 3 | 2.50 | 40.5 |

EXAMPLES 5 to 7

An LCP, a (4,4'-dicyclohexylmethane)polycarbodiimide, an electroconductive carbon powder and a filler were melt-kneaded in proportions shown in Example 1, 2 or 3, using a double-screw extruder to prepare a master batch. This master batch was molded into a fuel cell separator of 100 mm×100 mm×2 mm (thickness), using an injection molding machine. The fuel cell separator was measured for moldability and density.

Using the above fuel cell separator, a solid polymer type fuel cell was assembled. The fuel cell was subjected to a 200-hour power-generating test, in which the voltage after 200 hours was measured and a voltage reduction (%) relative to the initial voltage was calculated. As a result, both the separator and the fuel cell assembled therewith showed superior properties as seen in Table 3.

COMPARATIVE EXAMPLES 4 and 5

An LCP and an electroconductive carbon powder were melt-kneaded in proportions shown in Comparative Example 1 or 2, using a double-screw extruder to prepare a master batch. This master batch was molded into a fuel cell separator of 100 mm×100 mm×2 mm (thickness), using an injection molding machine. The fuel cell separator was measured for moldability and density.

Using the above fuel cell separator, a solid polymer type fuel cell was assembled. The fuel cell was subjected to a 200-hour power-generating test, in which the voltage after 200 hours was measured and a voltage reduction (%) relative to the initial voltage was calculated. As a result, both the separator and the fuel cell assembled therewith showed inferior properties as seen in Table 3.

TABLE 3

| | | Example 5 | Example 6 | Example 7 | Comparative Example 4 | Comparative Example 5 |
|---|---|---|---|---|---|---|
| Resin composition | | Example 1 | Example 2 | Example 3 | Comparative Example 1 | Comparative Example 2 |
| Separator | Density (g/cm³) | 1.84 | 1.80 | 1.80 | 1.60 | 1.55 |
| | Gas permeability (ml/m²·day·atm) | 6 | 15 | 17 | 1000 | 2000 |
| Fuel cell | Voltage reduction after 200 hours (%) | 100 | 99 | 99 | 60 | 50 |
| Moldability of Separator (exterior) | | Good | Good | Good | Bad | Bad |

As is clear from the above Examples and Comparative Examples, the fuel cell separator using the electroconductive resin composition of the present invention, which contains a carbodiimide compound, exhibits excellent high temperature resistance and hydrolysis resistance even under the fuel cell operating condition of wet atmosphere of high temperature to 120° C., and the fuel cell produced with the separator can show stable operation and improved durability.

Further, the electroconductive resin composition of the present invention, which contains a liquid crystal polyester resin as a main resin component, can be subjected to injection molding when produced into a fuel cell separator (it allows mass production of fuel cell separator), which can reduce the production cost of fuel cell separator and improve the productivity of fuel cell separator.

What is claimed is:
1. A fuel cell separator made of an electroconductive resin composition comprising:

(A) a liquid crystal polyester resin capable of forming an anisotropic melt phase, in an amount of 100 parts by weight, (B) a carbodiimide compound in an amount of 0.01 to 30 parts by weight, (C) an electroconductive carbon powder in an amount of 50 to 3,000 parts by weight, and (D) a filler in an amount of 0 to 10,000 parts by weight.

2. A process for producing a fuel cell separator, which comprises molding a electroconductive resin composition comprising:

(A) a liquid crystal polyester resin capable of forming an anisotropic melt phase, in an amount of 100 parts by weight, (B) a carbodiimide compound in an amount of 0.01 to 30 parts by weight, (C) an electroconductive carbon powder in an amount of 50 to 3,000 parts by weight, and (D) a filler in an amount of 0 to 10,000 parts by weight, into a separator shape.

3. A solid polymer fuel cell comprising the fuel cell separator set forth in claim 1.

* * * * *